(12) United States Patent
Williams (10) Patent No.: US 6,435,081 B1
(45) Date of Patent: Aug. 20, 2002

(54) TOASTER COVER

(76) Inventor: Jesse L. Williams, 2102 Summer Wind Dr., Marietta, GA (US) 30060

( * ) Notice: Subject to any disclaimer, the term of this patent is extended or adjusted under 35 U.S.C. 154(b) by 0 days.

(21) Appl. No.: 09/717,196

(22) Filed: Nov. 21, 2000

Related U.S. Application Data (60) Provisional application No. 60/167,577, filed on Nov. 26, 1999.

(51) Int. Cl.[7] ................................................. A47J 37/08
(52) U.S. Cl. ........................ 99/646 R; 99/385; D6/610; D7/391
(58) Field of Search .............................. 99/646 R, 645, 99/385; 150/158, 164, 765; D6/610, 612; D7/390, 397

(56) References Cited

U.S. PATENT DOCUMENTS

D282,045 S  *  1/1986  Pratt ............................ D7/390
D386,349 S  *  11/1997  Wysocky et al. ............ D6/610

* cited by examiner

*Primary Examiner*—Reginald L. Alexander
(74) *Attorney, Agent, or Firm*—Gardner Groff & Mehrman, P.C.

(57) ABSTRACT

A toaster cover, such as for use with a toaster, that safely and effectively covers a toaster while enhancing usability is described. The toaster cover includes first and second rigid side panels spaced apart from one another. The toaster cover also includes rigid front and back panels extending between the first and second side panels and spaced apart from each other. A rigid top panel is attached to the side panels and the front and back panels.

20 Claims, 8 Drawing Sheets

TOASTER COVER

CROSS REFERENCE TO RELATED APPLICATIONS

This patent application claims priority in a provisional patent application filed on Nov. 26, 1999 with Ser. No. 60/167,577.

TECHNICAL FIELD

The present invention relates generally to covers for kitchen appliances, and more particularly to a toaster cover for covering the common kitchen toaster.

BACKGROUND OF THE INVENTION

For covering the ubiquitous kitchen toaster, it has been common in the past to use a flexible, fabric cover to conceal the toaster as it sits on a counter or shelf. While fabric toaster covers can conceal the toaster, their use can create considerable disadvantages. When the toaster is in use, the fabric cover can create a potential fire hazard. In addition, using a traditional toaster cover hinders use of the toaster with the toaster cover in place. Moreover, personalizing fabric toaster covers to match a room's decor can present tremendous manufacturing challenges.

Accordingly, it is to the provision of a toaster cover which overcomes these problems of the known prior art by safely and effectively covering a toaster while enhancing usability to which the present invention is primarily directed.

SUMMARY OF THE INVENTION

The present invention meets the needs described above in a toaster cover, such as for use with a toaster, that safely and effectively covers a toaster while enhancing usability.

Briefly described, in a first form the present invention is a toaster cover that includes first and second rigid side panels spaced apart from one another. The toaster cover also includes rigid front and back panels extending between the first and second side panels and spaced apart from each other. A rigid top panel is attached to the side panels and the front and back panels.

In a second form, the toaster cover includes first and second rigid side panels spaced apart from one another. The toaster cover also includes a rigid front panel extending between the first and second side panels and a rigid back panel extending between the first and second side panels and spaced from the front panel. A rigid top panel is removably attached to the side panels and to the front and back panels.

In a third form, the toaster cover includes first and second rigid side panels spaced apart from one another. The toaster cover also includes a rigid front panel extending between the first and second side panels and a rigid back panel extending between the first and second side panels and spaced from the front panel. Additionally, this form of the toaster cover includes a rigid top panel attached to the side panels and to the front and back panels and a rigid bottom panel positioned to receive toast remnants emitted from a toaster.

A toaster cover according to the present invention provides several advantages that include improving the aesthetic appeal of a concealed toaster using decorative elements. In addition, the present invention enables use of a toaster without removing it from the toaster cover and increases safety during use. Finally, the invention maintains a neat environment around the toaster cover by avoiding the visible display of toaster remnants resulting from continual use of a toaster.

These and other features and advantages of the present invention will become apparent upon reading the following specification in conjunction with the accompanying drawing figures.

DETAILED DESCRIPTION OF THE PREFERRED EMBODIMENTS

Referring now in detail to the drawing figures, wherein like reference numerals represent like parts throughout the several view, FIGS. 1–5 show a toaster cover in accordance with the invention for use with a toaster (not shown).

The toaster cover 10 includes rigid side panels 11 and 12 spaced apart from one another and rigid end panels or front and rear panels 13 and 14 spaced apart from each other and extending between the side panels. The toaster cover 10 also includes a rigid top panel 16 attached to an extending between side panels 11 and 12 and the end panels 13 and 14. Together, the side panels, the end panels and the top panel form a rigid structure.

The manufacturing details of the toaster cover 10 can vary to comply with design constraints. For example, the side panels 11 and 12, front panel 13, rear panel 14, and rigid top panel 16 of the toaster cover 10 could be formed as a unitary structure with varying dimensions. These dimensions could be 6.5 inches by 4.25 inches by 10 inches for a toaster with dimensions of 5.5 inches by 3.25 inches by 9 inches. Alternatively, the dimensions of the toaster cover 10 can be other sizes, as well.

Most preferably, the toaster cover 10 is made of a single piece of ceramic or single piece of hard plastic material. This construction lends itself to efficient manufacturing. The rigidity also provides superior performance. Moreover, the use of a hard plastic or ceramic material reduces the chance of fire resulting from contact with the hot toaster components. In this regard, a ceramic toaster cover is considered to be most preferable.

Figure 1:
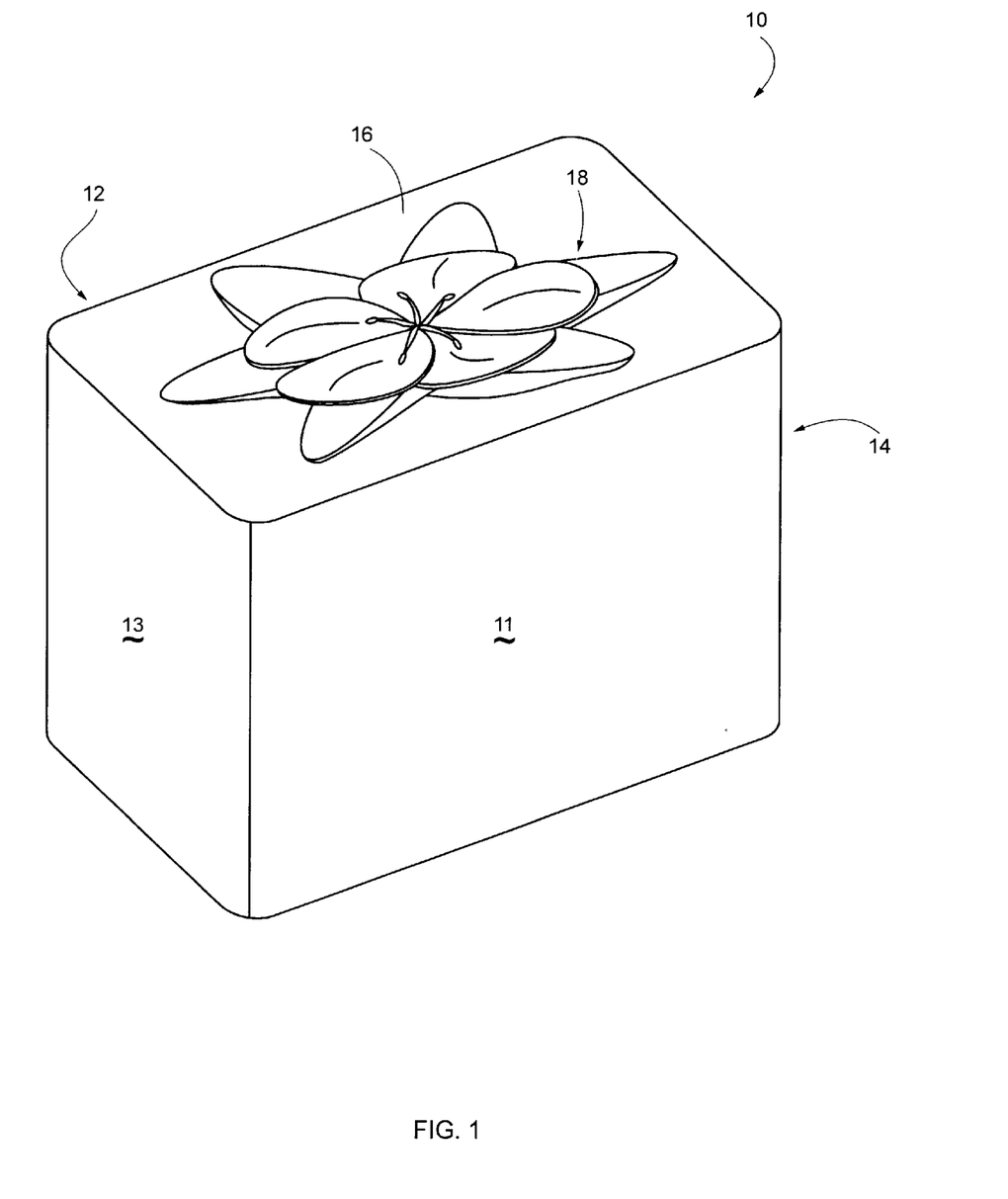
FIG. 1 is a right front perspective view of a toaster cover according to a preferred form of the invention.
Figure 2:
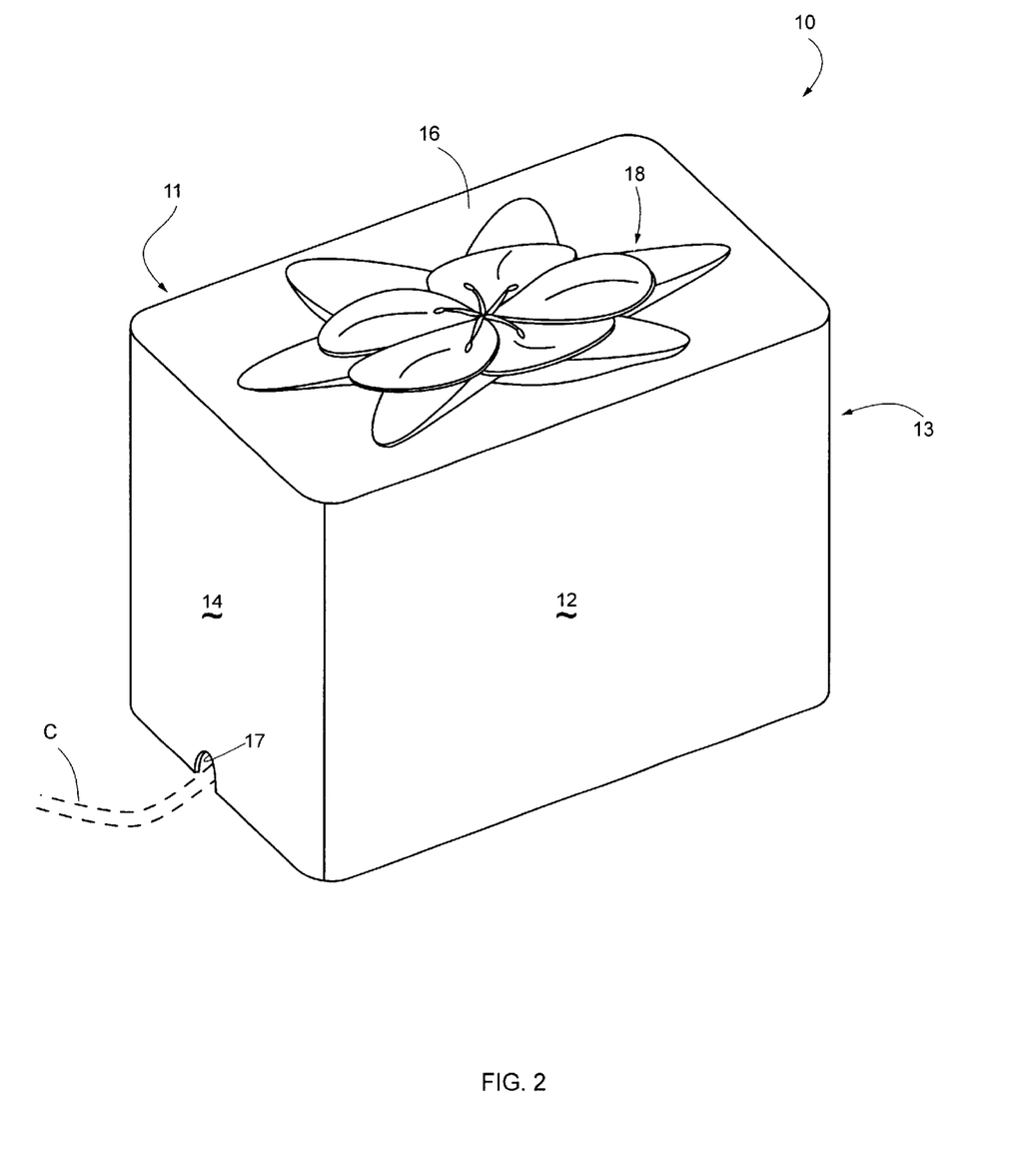
FIG. 2 is a left rear perspective view of the toaster cover of FIG. 1.
Figure 3:
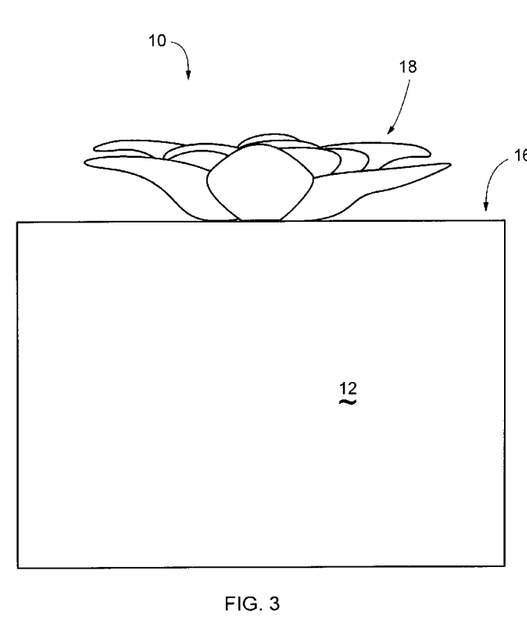
FIG. 3 is a side elevation view of the toaster cover of FIG. 1.
Figure 4:
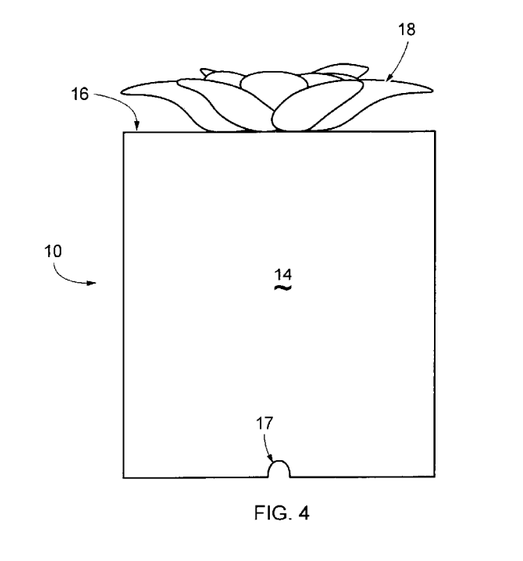
FIG. 4 is a rear elevation view of the toaster cover of FIG. 1.
Figure 5:
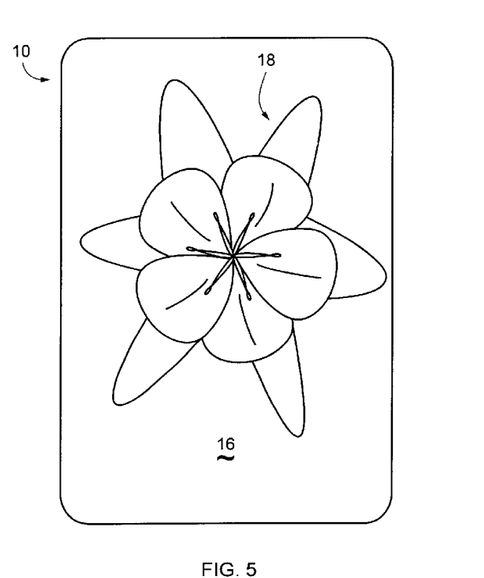
FIG. 5 is a top view of the toaster cover of FIG. 1.

As best shown in FIGS. 2 and 4, the rigid back panel includes a cutout or opening 17 extending therethrough for allowing a chord C (shown in - - - lines in FIG. 2) to extend from the inside of the toaster cover to the outside thereof. The dimensions of the opening 17 can vary allowing use with toasters of varying cord size. While FIGS. 2 and 4 illustrate a semi-circular opening, openings of other shapes can also be used.

Optionally, the top panel or any of the four side panels can be provided with decorative items or personalization. As shown in FIG. 1–FIG. 5, the top panel 16 can be provided with a decorative three dimensional element, here shown as a flower 18. The color selected for this decorative element can also provide another level of personalization. In this regard, the rigid nature of the toaster cover 10 provides superior capabilities for supporting such three dimensional structures. If this decorative element is made of a ceramic or hard plastic material, the decorative element can be used as a handle to transport the toaster cover 10. For example, lifting up on the decorative element can remove the toaster cover 10 from an associated toaster.

Figure 6:
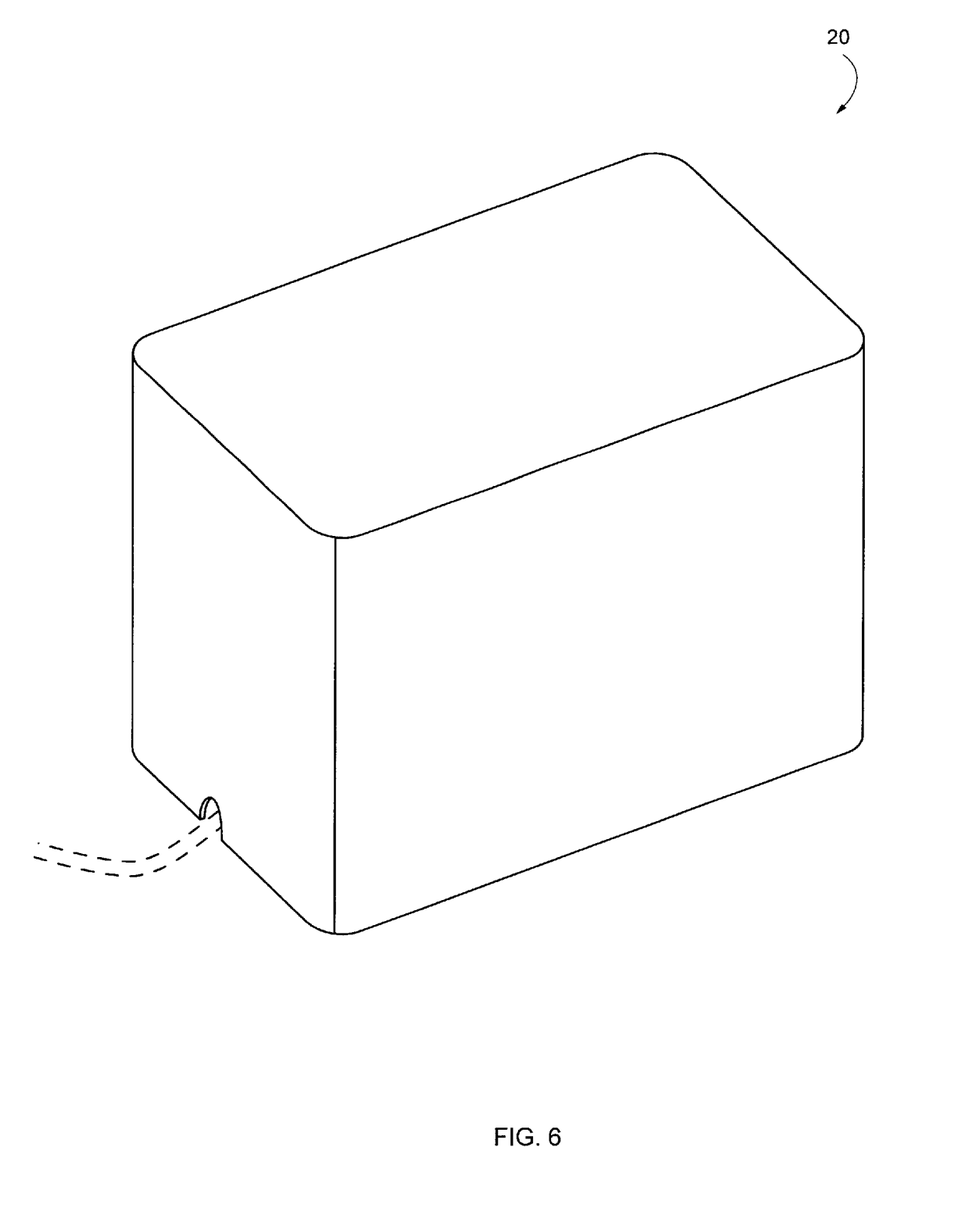
FIG. 6 is a left rear perspective view of a toaster cover according to a first modified form of the present invention.

FIG. 6 shows a modified form of the present invention, namely a toaster cover 20, as generally described above, without such a three dimensional decorative element affixed thereto. Though not shown, this form of the invention can include two-dimensional decorative items affixed to the top panel or any of the four side panels. For example, a flower can be painted on the side panels of the toaster cover 20.

Figure 7:
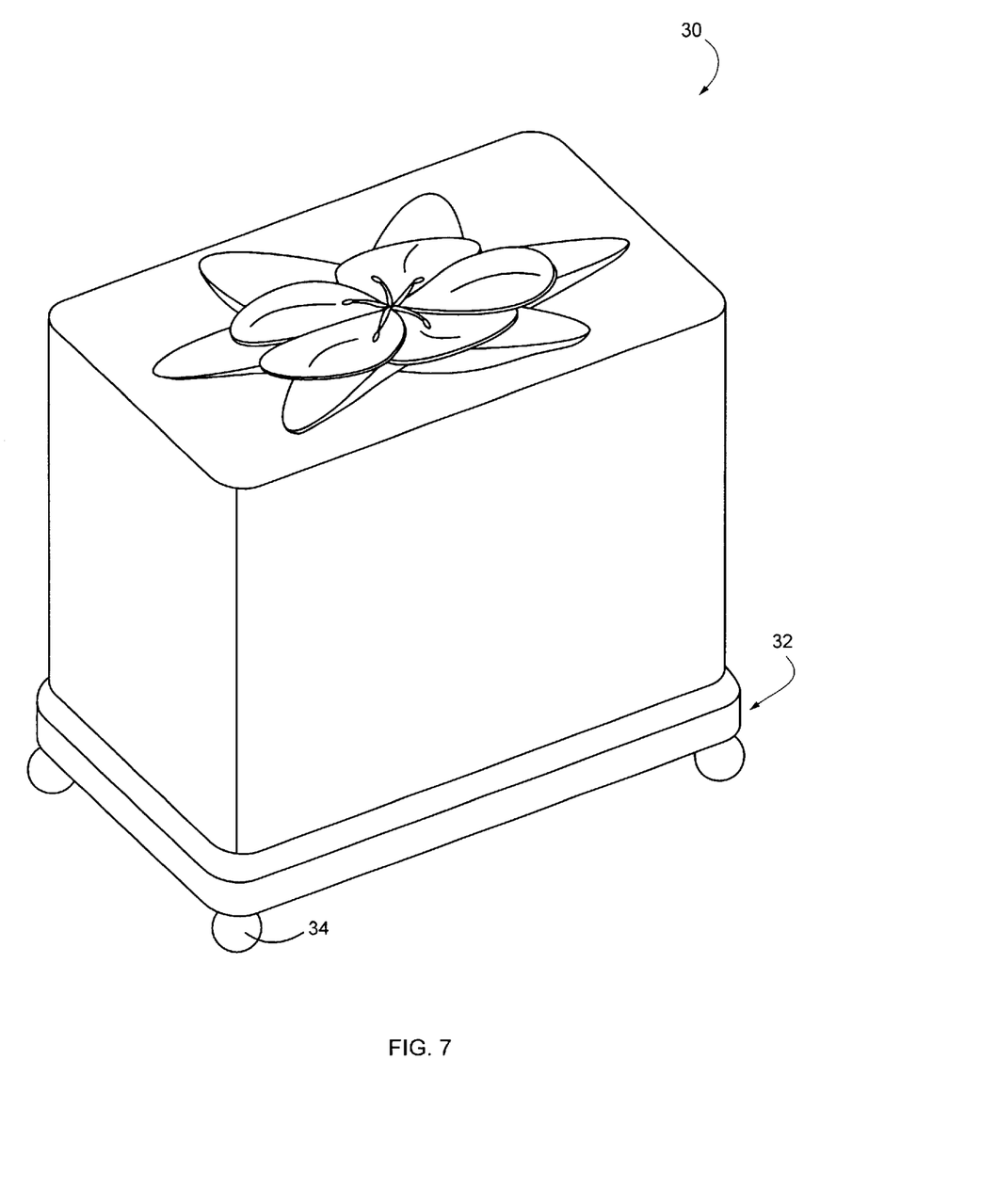
FIG. 7 is a right front perspective view of the toaster cover according to a second modified form illustrating a bottom panel.

FIG. 7 is a right front perspective view of a toaster cover 30 according to a second modified form illustrating a bottom panel 32. The dimensions of the bottom panel 32 can vary to accommodate varying sizes of the toaster cover 30. For example, a toaster cover with dimensions of 4.25 inches by 10 inches can use a bottom panel with dimensions 4.5 inches by 10.25 inches, for example. The bottom panel 32 supports the toaster cover 30 and can include legs 34 with a height 0.25 inches. Functionally, the bottom panel 32 can collect toast remnants emitted from a toaster. For example, continual use of a toaster can result in an accumulation of crumbs in the bottom of the toaster. As these crumbs fall from the toaster, the bottom panel 32 can collect them. Because the area of the bottom panel 32 exceeds the area of the toaster cover 30, this panel can effectively conceal these crumbs. Consequently, the toaster cover 30 avoids the unsightly mess of traditional toasters.

Figure 8A:
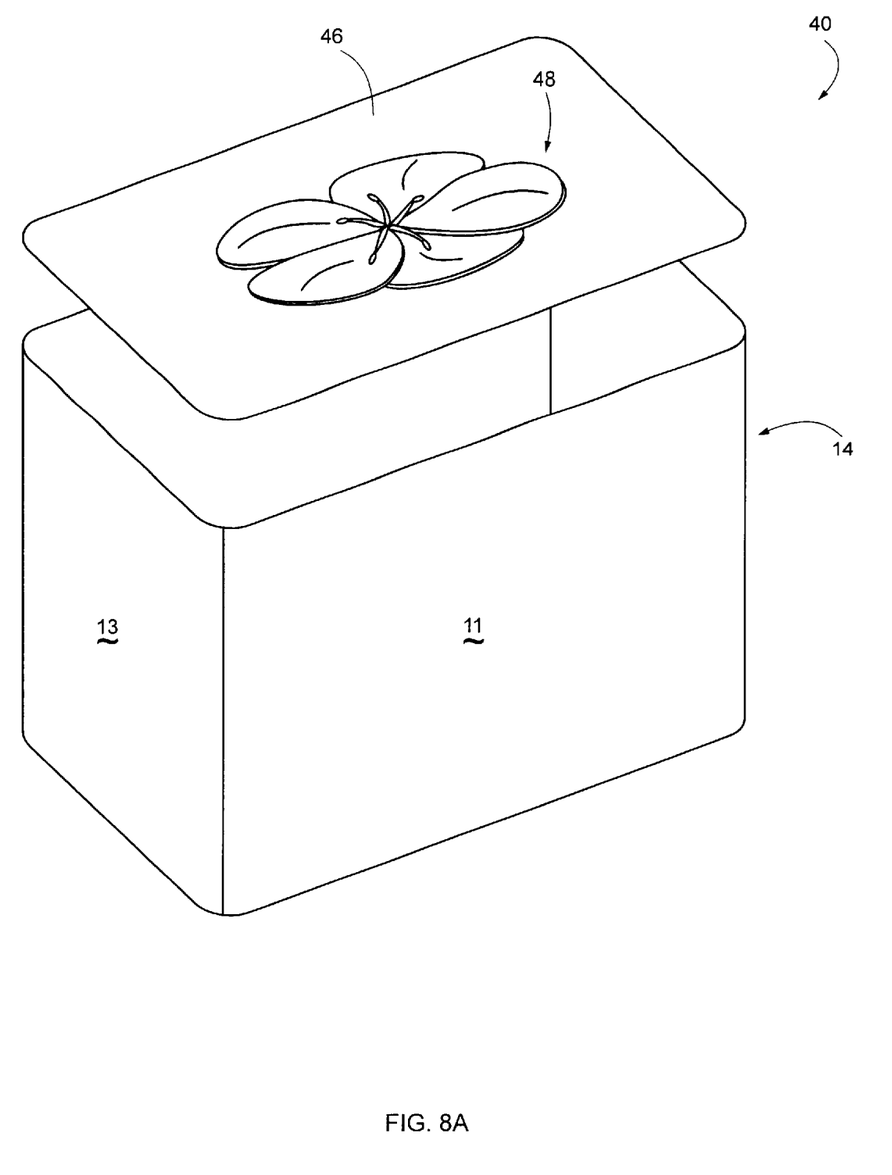
FIG. 8A is a right front perspective view of a toaster cover according to a third modified form illustrating a removable top panel.
Figure 8B:
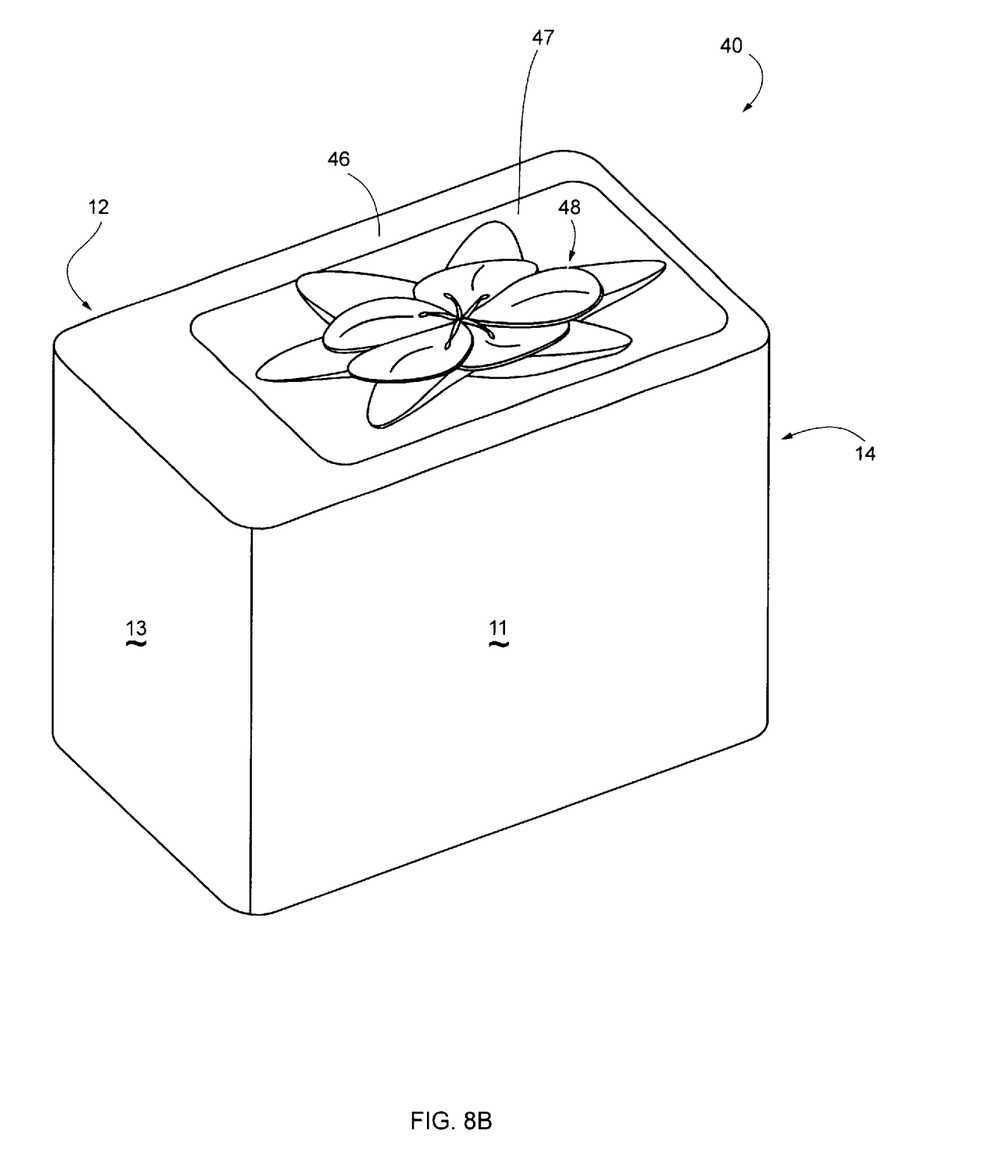
FIG. 8B is a right front perspective view of the toaster cover of FIG. 8A illustrating the portion of the top panel that is removable.

FIG. 8A is a right front perspective view of a toaster cover 40 according to a third modified form illustrating a removable top panel 46. The flower 18 could be used as a handle that removes the removable top panel 46. After removing the top panel 46, a slice of bread, for example, can be inserted into a toaster located under the toaster cover 40. FIG. 8B is a right front perspective view of the toaster cover 40 illustrating a portion 47 of the top panel 46 that is removable. The size and shape of the removable portion 47 can vary depending on the type of toaster associated with the toaster cover 40. For example, a toaster with four deposit slots can have a larger removable portion 47 than a toaster with two deposit slots. In contrast, the entire top panel 46 could be removable.

Figure 9:
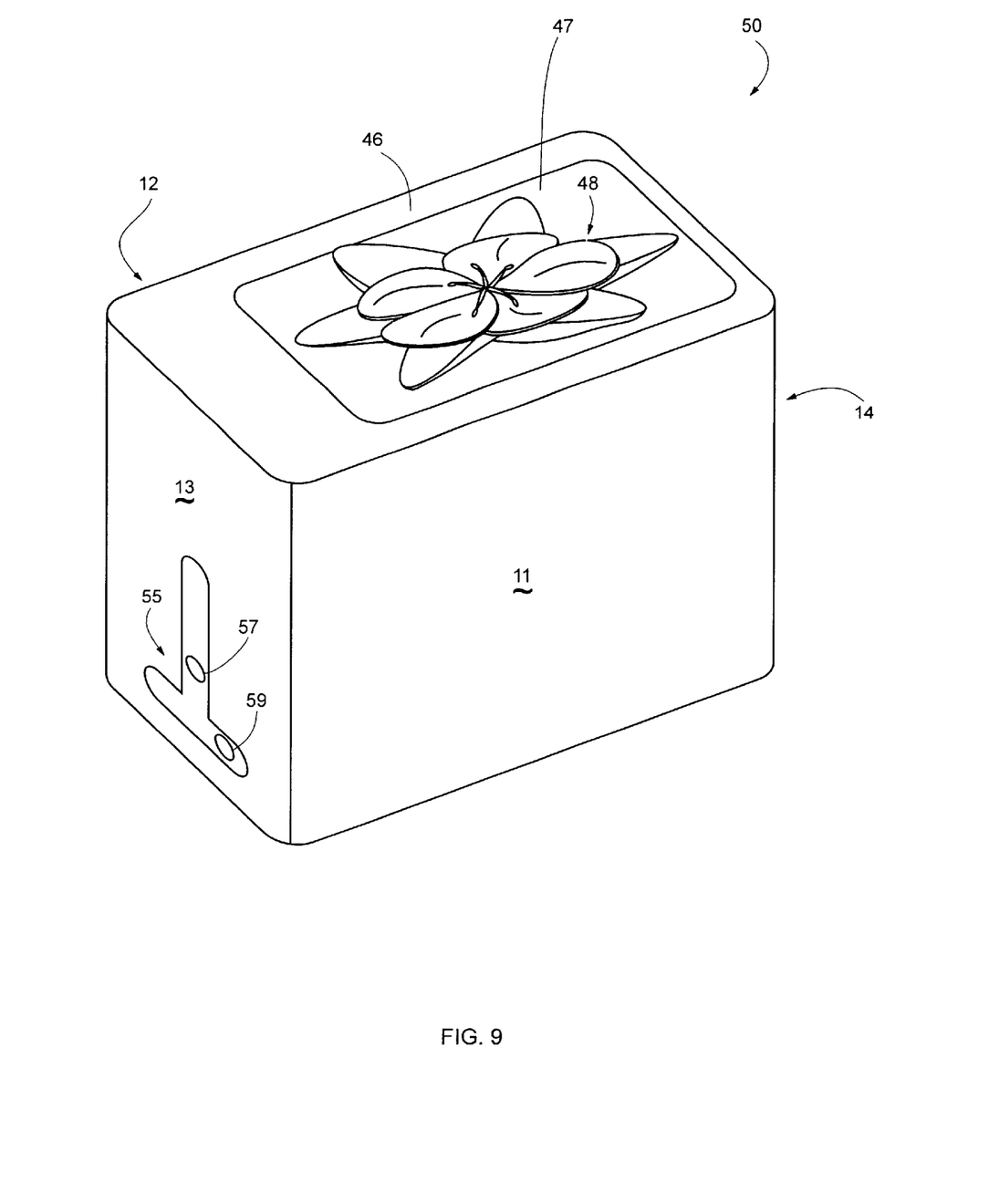
FIG. 9 is a right perspective view of a toaster cover according to a fourth modified form illustrating a control opening in the front panel.

FIG. 9 is a right perspective view of a toaster cover 50 illustrating a control cutout or control opening 55 in the front panel 53. The control opening 55 that enables a toaster's control elements to extend through the toaster cover 50. The control elements can include an activation handle 57 and a heat controller 59. Depressing the extended portion of an activation handle 57 can activate a toaster. In addition, varying the extended portion of a heat controller 59 can adjust the heating period of the toaster.

Together the removable portion 47 and the control opening 55 enable use of a toaster without removing an associated toaster cover 50. For example, a user can insert a bagel into a toaster's deposit slots by removing the removable portion 47. In addition, the user can select the appropriate setting and activate the toaster because the control elements extend through the control opening. After removing the toasted bagel, a user can put the removable portion 47 back in place. Any crumbs falling from the toaster could be collected using bottom panel 34 (see FIG. 7).

A toaster cover according to the present invention safely and effectively conceals a toaster while enhancing usability. The present invention improves the aesthetic appeal of the common kitchen toaster by including decorative elements. It also can easily adapt to various toaster dimensions and cord sizes. In addition, the present invention includes a removable portion of a top panel and a control opening that enable use of a toaster without removing it from the toaster cover. Moreover, the material composition of the toaster cover increases safety by avoiding the fire hazard created by conventional toaster covers. Finally, a bottom panel avoids visible display of toaster remnants resulting from continual use of a toaster.

While the invention has been disclosed in preferred forms, those skilled in the art will recognize that many modifications, additions, and deletions can be made therein without departing from the spirit and scope of the invention as set forth in the following claims.

I claim:

1. A toaster cover, comprising:
   first and second rigid side panels spaced apart from one another;
   a rigid front panel extending between said first and second side panels;
   a rigid back panel extending between said first and second side panels and spaced from said front panel, wherein said front panel defines a control opening for allowing control elements of a toaster to extend therethrough; and
   a rigid top panel attached to said side panels and to said front and back panels.

2. A toaster cover as claimed in claim 1 wherein said control elements comprise an activation handle and a heat controller.

3. A toaster cover as claimed in claim 1 wherein said rigid top panel is removable.

4. A toaster cover as claimed in claim 3 further comprising a handle attached to said rigid top panel to enable removal of said rigid top panel.

5. A toaster cover as claimed in claim 4 wherein said handle comprises a decorative element.

6. A toaster cover as claimed in claim 1 wherein said top panel, said side panels and said front and back panels comprise a ceramic material.

7. A toaster cover as claimed in claim 1 wherein said top panel, said side panels, and said front and back panels comprise a plastic material.

8. A toaster cover, comprising:
   first and second rigid side panels spaced apart from one another;
   a rigid front panel extending between said first and second side panels;
   a rigid back panel extending between said first and second side panels and spaced from said front panel;
   a rigid top panel attached to said side panels and to said front and back panels; and a rigid bottom panel positioned to receive toast remnants emitted from a toaster.

9. A toaster cover as claimed in claim 8 wherein said rigid bottom panel comprises a plurality of legs for supporting said toaster cover.

10. A toaster cover, comprising:

first and second rigid side panels spaced apart from one another;

a rigid front panel extending between said first and second side panels;

a rigid back panel extending between said first and second side panels and spaced from said front panel, wherein said back panel defines a cord opening for allowing a cord of a toaster to extend therethrough; and a rigid top panel attached to said side panels and to said front and back panels.

11. A toaster cover as claimed in claim 10 further comprising a rigid bottom panel positioned to receive toast remnants emitted from a toaster.

12. A toaster cover, such as for use with a toaster, comprising:

first and second rigid side panels spaced apart from one another;

a rigid front panel extending between said first and second side panels;

a rigid back panel extending between said first and second side panels and spaced from said front panel;

a rigid top panel removably attached to said side panels and to said front and back panels; and a rigid bottom panel positioned to receive toast remnants emitted from the toaster.

13. A toaster cover as claimed in claim 12 further comprising a handle attached to said rigid top panel to enable removal of said rigid top panel.

14. A toaster cover as claimed in claim 12 wherein said top panel, said side panels and said front and back panels comprise a ceramic material.

15. A toaster cover, such as for use with a toaster, comprising:

first and second rigid side panels spaced apart from one another;

a rigid front panel extending between said first and second side panels, wherein said front panel defines a control opening for allowing control elements of the toaster extend therethrough;

a rigid back panel extending between said first and second side panels and spaced from said front panel; and a rigid top panel removably attached to said side panels and to said front and back panels.

16. A toaster cover as claimed in claim 15 further comprising a rigid bottom panel positioned to receive toast remnants emitted from the toaster.

17. A toaster cover, such as for use with a toaster, comprising:

first and second rigid side panels spaced apart from one another;

a rigid front panel extending between said first and second side panels;

a rigid back panel extending between said first and second side panels and spaced from said front panel;

a rigid top panel attached to said side panels and to said front and back panels; and a rigid bottom panel positioned to receive toast remnants emitted from the toaster.

18. A toaster cover as claimed in claim 17 wherein said top panel, said side panels and said front and back panels comprise a ceramic material.

19. A toaster cover as claimed in claim 17 wherein said front panel defines a control opening for allowing control elements of the toaster to extend therethrough.

20. A toaster cover as claimed in claim 17 wherein said rigid top panel is removable.

* * * * *